No. 822,787. PATENTED JUNE 5, 1906.
M. TRUE.
COMBINED HARROW AND CULTIVATOR.
APPLICATION FILED MAY 23, 1905.

3 SHEETS—SHEET 1.

WITNESSES:
C. Edward Duffey
Amos W Hart

INVENTOR
Meshack True
BY Munn & Co.
ATTORNEYS

No. 822,787. PATENTED JUNE 5, 1906.
M. TRUE.
COMBINED HARROW AND CULTIVATOR.
APPLICATION FILED MAY 23, 1905.

3 SHEETS—SHEET 3.

WITNESSES:

INVENTOR
Meshack True
BY Munn & Co.
ATTORNEYS

UNITED STATES PATENT OFFICE.

MESHACK TRUE, OF WATERVALLEY, MISSISSIPPI.

COMBINED HARROW AND CULTIVATOR.

No. 822,787.  Specification of Letters Patent.  Patented June 5, 1906.

Application filed May 23, 1905. Serial No. 261,808.

*To all whom it may concern:*

Be it known that I, MESHACK TRUE, a citizen of the United States, residing at Watervalley, in the county of Yalobusha and State of Mississippi, have made certain new and useful Improvements in a Combined Harrow and Cultivator, of which the following is a specification.

The invention is an improvement in that class of cultivating implements which comprise two like frames provided with teeth spaced apart and connected flexibly, whereby they are adapted to straddle a growing crop.

The details of construction, arrangement, and combination of parts are as hereinafter described, reference being had to the accompanying drawings, in which—

Figure 1:
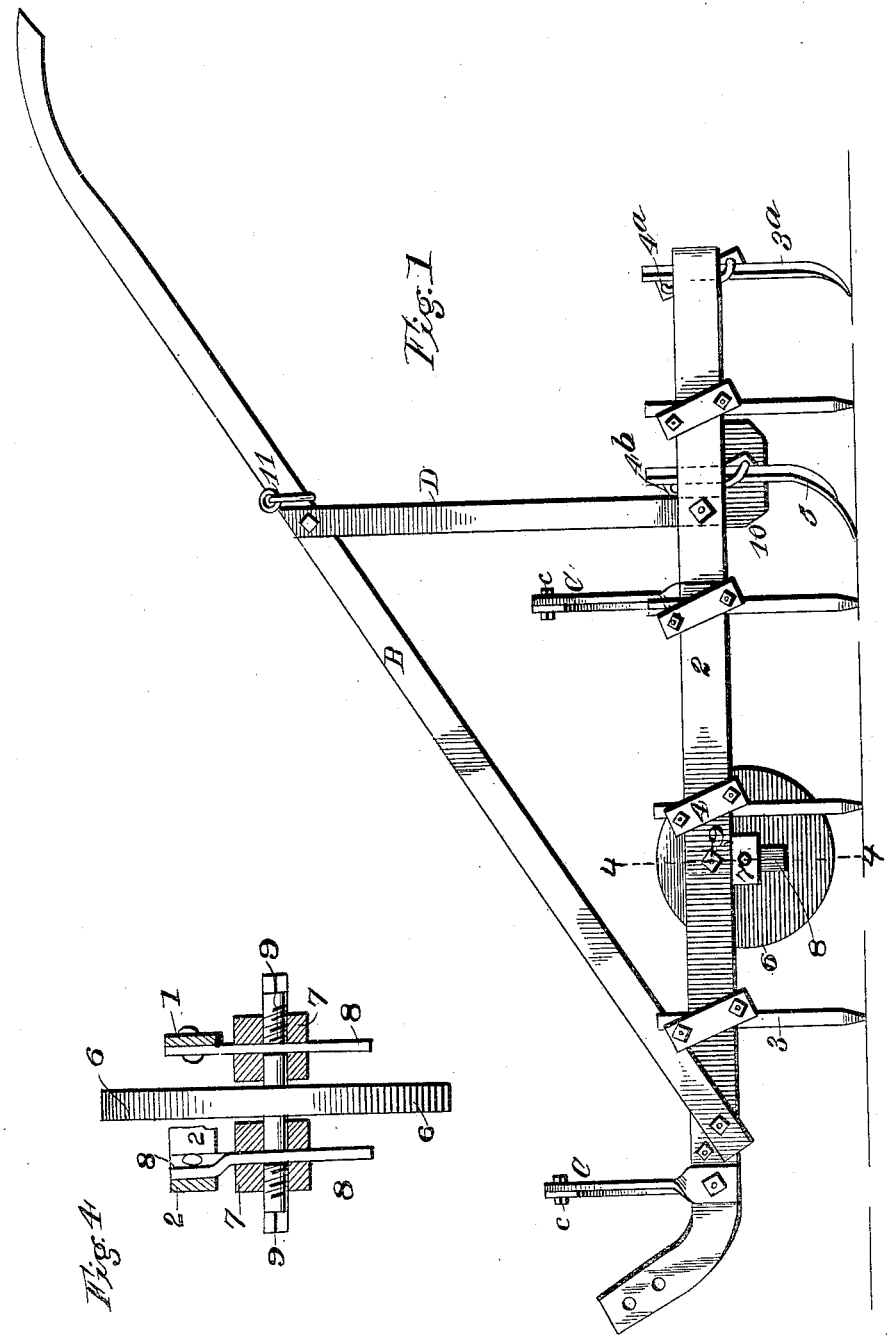
Figure 2:
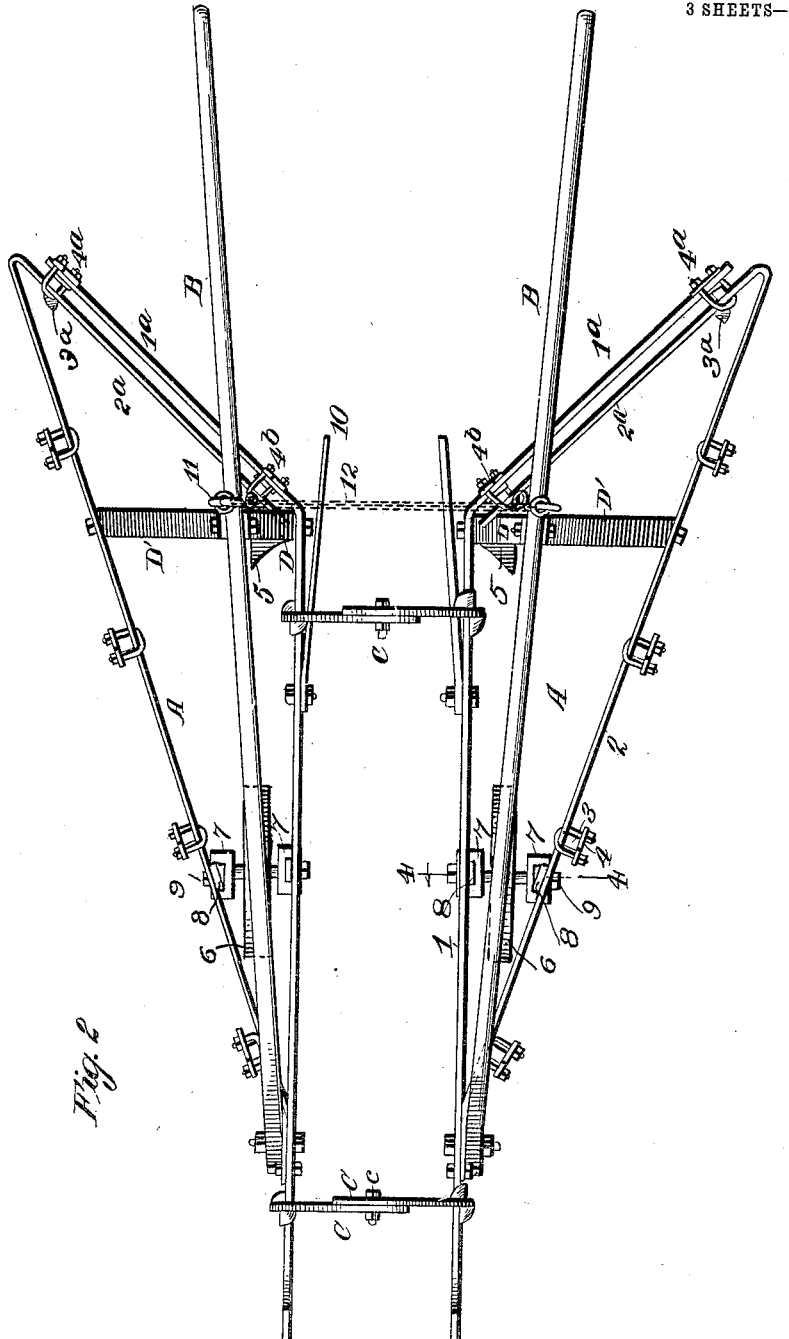
Figure 3:
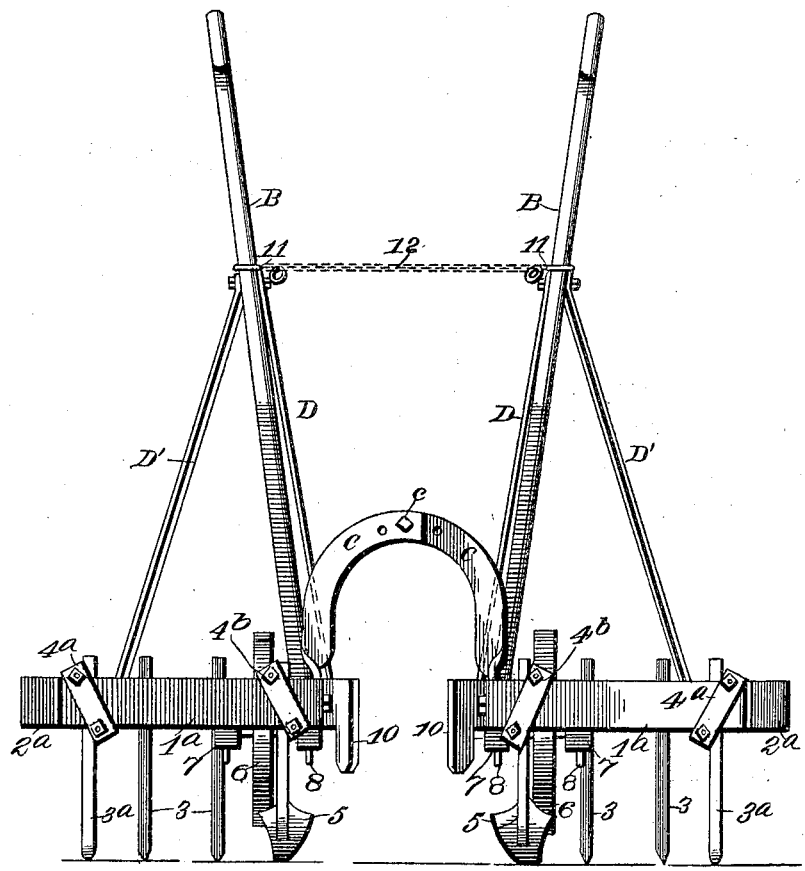

Figure 1 is a side elevation of my improved harrow and cultivator. Fig. 2 is a plan view of the same, and Fig. 3 is a rear end view. Fig. 4 is a vertical cross-section on line 4 4 of Fig. 1.

The frame of the implement consists of two like parts A A, each having a handle B and the two being pivotally connected by means of curved or arc bars C, which are bolted together at $c$. The meeting and lapping ends of these bars C are provided with a series of holes to provide for adjustment of the frames A at different distances from each other, as conditions may require in cultivating between rows of different plants. The handles B extend rearward beyond the frames A and are supported in an inclined position by means of braces D D'. (See especially Fig. 3.) Each of the side frames A is constructed mainly of two metal bars 1 and 2, the former having an obtuse angle and the latter an acute angle, as shown in Fig. 2.

A series of harrow-teeth 3 are attached to the side bar 2 by clevises 4, and curved teeth $3^a$ are similarly attached to the rear ends of the triangular frames by clevises $4^a$, which also secure together the two bent rear ends $1^a$ $2^a$ of the frame-bars 1 2. Turning plows or cultivators 5 are attached at the inner angles of the bars 1, their shanks lying between the two portions $1^a$ $2^a$ of the frames and secured by clamps $4^b$.

For the purpose of supporting the triangular frames A A so that they may be adjusted vertically as required for causing the cultivating or harrow teeth to enter the soil at any required depth or to provide for transporting the implement to and from the field I employ wheels 6, the axles of which are journaled in sockets 7, that are slidable on bars 8, pendent from the frame-bars 1 2 of each frame, the said sockets being clamped to the bars 8 by means of screws 9. As shown in Figs. 2 and 4, the said wheels are arranged between the bars 1 and 2 and parallel to the former and at such point between the front and rear ends of the triangular frames as to properly balance the latter. It will be seen that this construction and combination of parts provides for convenient vertical adjustment of the wheels 6 as conditions may require.

Fenders are attached to the inner bars 1, and the handles B are connected by hooks 11 and chain 12.

Having thus described my invention, what I claim as new, and desire to secure by Letters Patent, is—

In a cultivating implement of the class indicated, the combination, with two like triangular frames provided with teeth and spaced apart and flexibly connected and provided with pendent bars 8, of wheels having axles provided with sockets 7 adapted to receive and slide upon the said bars 8, and clamp-screws 9 applied for securing the sockets in any required adjustment, the wheels being arranged parallel to the inner sides 1 of said frames in the manner shown and described.

MESHACK TRUE.

Witnesses:
J. T. BLOUNT,
J. LELAND TRUSTY.